(12) United States Patent
Hong et al.

(10) Patent No.: US 7,149,058 B2
(45) Date of Patent: Dec. 12, 2006

(54) ACTUATOR LATCH WITH VARIABLE RETENTION FORCE

(75) Inventors: Yiren Hong, Singapore (SG); TakKoon Ooi, Singapore (SG); Yongjie Tang, Singapore (SG); ChorShan Cheng, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 263 days.

(21) Appl. No.: 10/731,801

(22) Filed: Dec. 9, 2003

(65) Prior Publication Data
US 2005/0122628 A1    Jun. 9, 2005

(51) Int. Cl.
*G11B 21/22* (2006.01)
(52) U.S. Cl. .................................. 360/256.2
(58) Field of Classification Search ............. 360/256.2, 360/245.3, 236.3, 235.7, 235.8, 244.2, 236.4, 360/266
See application file for complete search history.

(56) References Cited

U.S. PATENT DOCUMENTS

| | | | |
|---|---|---|---|
| 5,005,095 A | 4/1991 | Wagner | |
| 5,233,493 A | 8/1993 | Eliason | |
| 5,381,290 A * | 1/1995 | Cheng | ..................... 360/256.3 |
| 5,469,316 A | 11/1995 | Koriyama | |
| 5,566,375 A | 10/1996 | Isomura | |
| 5,666,244 A | 9/1997 | Ogawa | |
| 5,768,063 A * | 6/1998 | Suwa et al. | ............... 360/256.2 |
| 5,956,213 A | 9/1999 | Dague et al. | |
| 6,429,999 B1 | 8/2002 | Dague et al. | |
| 6,462,914 B1 * | 10/2002 | Oveyssi et al. | .......... 360/264.8 |
| 6,549,380 B1 * | 4/2003 | Kazmierczak | ........... 360/264.8 |
| 6,606,223 B1 * | 8/2003 | Ooi et al. | ................. 360/264.9 |
| 2003/0081354 A1 | 5/2003 | Ooi et al. | |
| 2003/0197980 A1 * | 10/2003 | Hong et al. | ............... 360/264.7 |
| 2004/0012890 A1 * | 1/2004 | Kim et al. | ................ 360/256.2 |

* cited by examiner

*Primary Examiner*—Allen Cao
(74) *Attorney, Agent, or Firm*—Derek J. Berger

(57) ABSTRACT

Apparatus for latching an actuator, such as used in a data storage device. A moveable electrical coil is disposed adjacent a magnetically permeable structure. The coil is latched by magnetic flux passing across a gap extending into the structure which establishes a retention force upon the coil. The coil is subsequently unlatched by application of current to the coil which reduces the magnetic flux across the gap and hence, the magnitude of the retention force upon the coil. The current also concurrently induces movement of the coil away from the gap. The structure preferably comprises a unitary, c-shaped structure comprising a base member, a support member and a pole member, with the coil configured to surround and travel along a lateral extent of the pole member. A permanent magnet is nested on the base member. A plate is preferably coupled to the coil for abutment across the gap.

18 Claims, 3 Drawing Sheets

ACTUATOR LATCH WITH VARIABLE RETENTION FORCE

FIELD OF THE INVENTION

The claimed invention relates generally to the latching of a motor driven actuator and more particularly, but not by limitation, to an apparatus which employs a variable retention force latch to secure an actuator in a parked position.

BACKGROUND

Disc drives are digital data storage devices which store and retrieve large amounts of user data in a fast and efficient manner. The data are magnetically recorded on the surfaces of one or more data storage discs (media) affixed to a spindle motor for rotation at a constant high speed.

One or more data transducing heads read data from and write data to tracks defined on the disc surfaces. The heads are configured to be hydrodynamically supported over these surfaces by fluidic currents established by the high speed rotation of the discs. The heads are moved to the various tracks by application of current to an actuator motor, which rotates the actuator about a pivot shaft adjacent the outer diameter of the discs.

It is often desirable to employ a latching arrangement to secure the actuator in a latched position when the device is in a non-operational mode. This prevents the heads from being inadvertently jarred onto the disc surfaces by the application of a mechanical shock to the device. While various latching arrangements have been proposed in the art, there is a continued need in the art for an improved latching arrangement to secure a motor driven actuator.

SUMMARY OF THE INVENTION

As embodied herein and as claimed below, the present invention is generally directed to an apparatus for latching an actuator, such as in a data storage device.

A moveable electrical coil is adapted for movement along a magnetically permeable structure. The coil is latched by magnetic flux passing across a gap extending into the structure, the magnetic flux establishing a retention force upon the coil.

The coil is subsequently unlatched by application of current to the coil. The current substantially reduces the magnetic flux across the gap and hence, the magnitude of the retention force upon the coil. The current also concurrently induces movement of the coil away from the gap, allowing the coil to be moved to an unlatched position.

In a further embodiment, the structure may comprise a unitary, c-shaped structure comprising a base member, a support member and a pole member, with the coil preferably configured to surround and travel along a lateral extent of the pole member.

The apparatus may further comprise a permanent magnet coupled to the structure which induces a flow of magnetic flux in said structure. A plate may be coupled to the coil so that at least a portion of the magnetic flux passing across the gap flows through the plate to retain the coil in the latched position.

A compliant member may be disposed between the plate and the coil, with the compliant member damping vibrations as the coil moves to a position proximate the gap. A second compliant member may also be disposed opposite the plate to provide a limit stop for movement of the coil away from the shunt member.

These and various other features and advantages which characterize the claimed invention will become apparent upon reading the following detailed description and upon reviewing the associated drawings.

BRIEF DESCRIPTION OF THE DRAWINGS

FIG. 3 shows the actuator in an unlatched position and FIG. 4 shows the actuator in a latched position.

DETAILED DESCRIPTION

Figure 1:
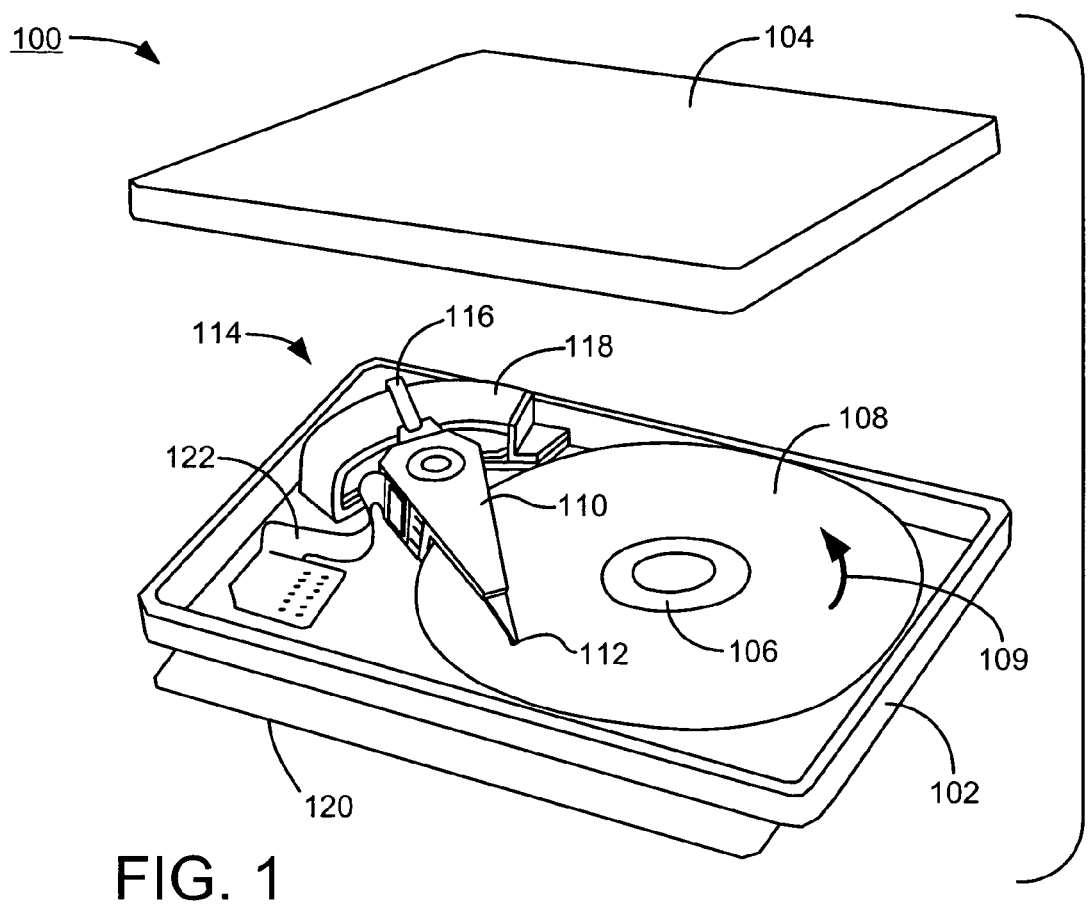
FIG. 1 is a generalized representation of a data storage device constructed in accordance with preferred embodiments of the present invention.

In order to describe an illustrative environment in which preferred embodiments of the present invention can be advantageously practiced, FIG. 1 shows a generalized representation of a data storage device 100 of the type used to store and retrieve digital data in a computer-based environment.

The device 100 may includes a base deck 102 and a top cover 104 which mate to form a sealed housing. A spindle motor 106 rotates one or more data storage discs 108 at a constant high speed in angular direction 109. A rotary actuator 110 supports one or more data transducing heads 112 adjacent the disc surfaces.

The actuator 110 is rotated by an actuator motor 114, preferably characterized as a voice coil motor (VCM). The actuator motor 114 includes a moveable electrical coil 116 which projects from the actuator 110 and a stationary magnetic circuit 118 which is mounted to the base deck 102.

Control circuitry (not shown) for the device 100 is supported on a printed circuit board (PCB) 120 mounted to the underside of the base deck 102. The control circuitry communicates with the actuator 110 via a flex circuit assembly 122.

Figure 2:
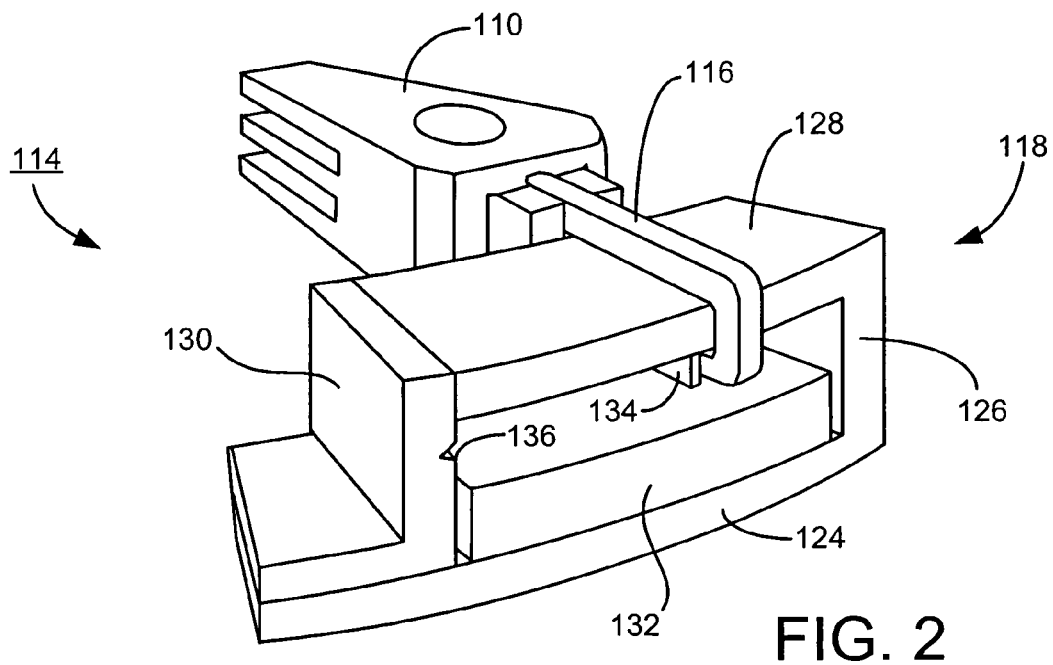
FIG. 2 illustrates an actuator motor of the data storage device of FIG. 1 in greater detail.

FIG. 2 shows the actuator motor 114 and relevant portions of one embodiment of the actuator 110 in greater detail. The magnetic circuit 118 in this embodiment comprises a c-shaped pole structure formed of magnetically permeable material, such as stainless steel, and includes a base member 124, a support member 126 and a laterally extending pole member 128. An end plate 130 abuts the base member 124 and the pole member 128 and is likewise formed of magnetically permeable material. A permanent magnet 132 is supported upon the base member 124 and is nested within the magnetic circuit 118 as shown.

Magnetic flux generated by the magnet 132 passes upwardly through the open space between the magnet 132 and the pole member 128. This flux is directed in opposite directions along the pole member 128, down the respective support member 124 and the end plate 130, and through the base member 124 to complete the circuit.

The support member 126 and the end plate 130 are characterized herein as shunt members, as these members facilitate the flow of magnetic flux between the pole member 128 and the base member 124. While preferred, the end plate 130 is not necessary; in alternative embodiments, the end plate 130 is omitted and the pole member 128 remains cantilevered in space by the support member 126.

The actuator coil 116 is configured to surround the pole member 128 as shown. By applying current to the coil 116, a magnetic field is established which interacts with the magnetic flux within the pole member 128 to establish a Lorentz Force upon the coil 116 in a direction determined by the respective directions of the current and the magnetic flux in the pole member 128. This force causes the coil 116 to controllably move along the lateral length of the pole member 128. As the coil 116 moves, the actuator 110 rotates and the selected head 112 is moved to a desired position adjacent the associated disc surface.

Figure 3:
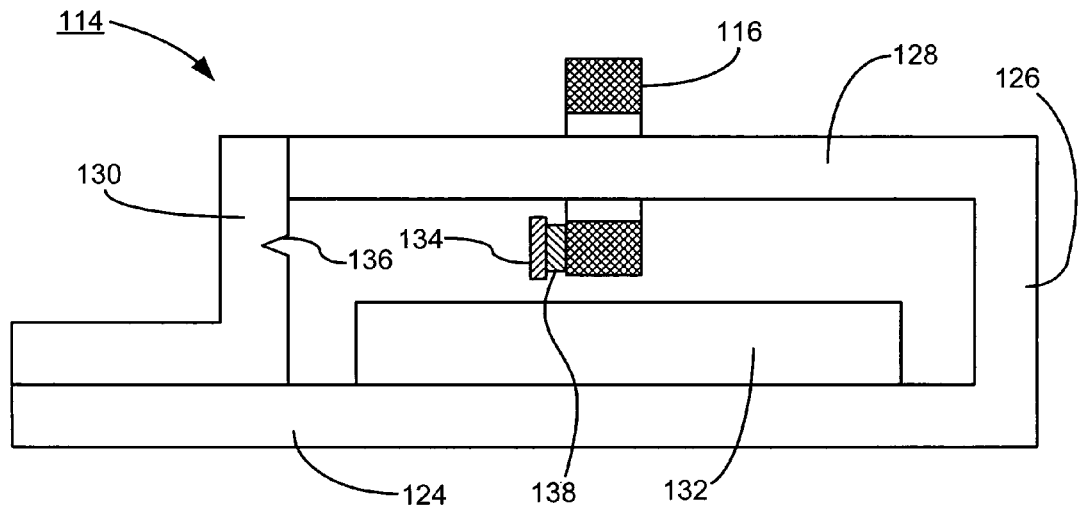
FIGS. 3 and 4 are elevational, partial cross-sectional representations of the actuator motor of FIG. 2 to illustrate a latch assembly used to secure an actuator of the device during a non-operational mode.
Figure 4:
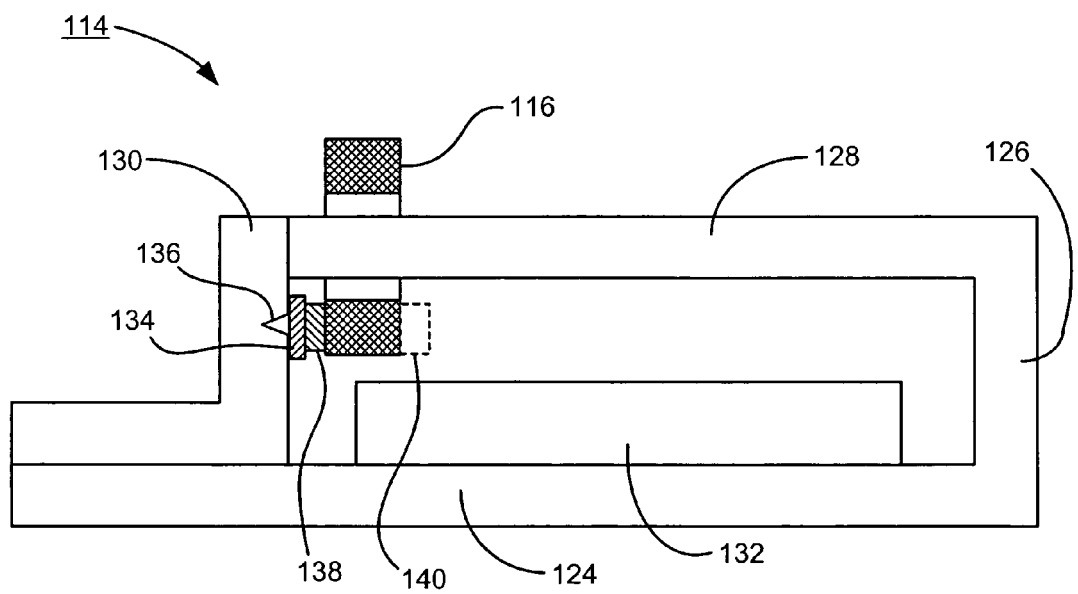

As further shown in FIGS. 3 and 4, a magnetically permeable plate 134 is coupled to the coil 116. The plate 134 is aligned with a gap 136 which extends into a selected shunt member (in this case the end plate 130, although the gap 136 could alternatively be formed in the support member 126). Some of the magnetic flux passing along the shunt member "fringes" across the gap 136 (i.e., passes through the air space within and adjacent the gap).

When the plate 134 is brought into a position adjacent the gap 136, at least a portion of the magnetic flux across the gap flows through the plate 134. This establishes a retention force which retains the plate 134 against the shunt member, placing the actuator 110 in a latched position during a non-operational mode of the device 100. This latched position is represented in FIG. 4.

Referring briefly back to FIG. 1, it will be noted that the latching of the actuator 110 against the end plate 130 as shown in FIG. 4 results in the heads 112 being parked adjacent the outermost diameter (OD) of the discs 108. Although not shown, it will be understood that a conventional ramp loading member can be advantageously employed to park the heads 112 while the actuator is latched in this manner.

Contrawise, forming the gap 136 in the support member 126 and moving the plate 134 to the other side of the coil would enable the heads 112 to be parked adjacent the innermost diameter (ID) of the discs 108, such as on a texturized contact landing zone (not shown).

The plate 134 can be rigidly affixed to the coil 116, but preferably, a layer of compliant material 138 is disposed between the plate and the coil. The compliant material 138 advantageously operates as a limit stop to reduce the potential for damage to the heads 112 and discs 108 should the coil 116 be moving at too great a velocity when the plate 134 comes into contact with the shunt member. As desired, a second layer of complaint material (shown in broken line fashion at 140) can be added opposite the plate to likewise act as a second limit stop for movement of the actuator 110 in the opposite direction.

The latching arrangement shown in FIGS. 3–4 is configured to provide a sufficiently strong retention force to enable the actuator 110 to remain in the latched position even when the device 100 is subjected to substantial magnitudes of non-operational shock and vibration. Significantly, the latching arrangement further provides a selectably reduced retention force to enable the actuator 110 to be easily unlatched and moved to an operational position (FIG. 3), as will now be discussed with reference to FIGS. 5–7.

Figure 5:
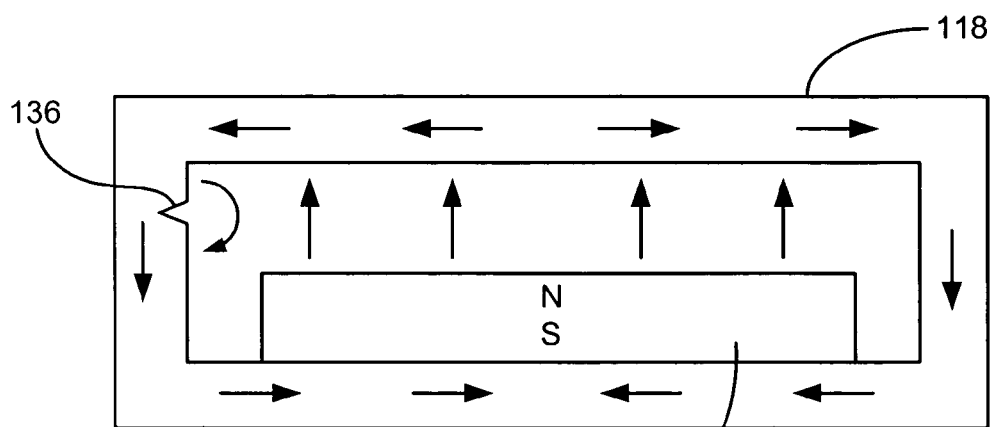
FIG. 5 is a schematic representation of a magnetic circuit of the actuator motor to generally show directions of magnetic flux established by the circuit.

FIG. 5 represents the magnetic circuit 118 without the coil 116 to generally illustrate a flow of the magnetic flux therein induced by the magnet 132. With a north-south magnetic arrangement of the magnet 132 as indicated in FIG. 5, the magnetic flux lines pass downwardly through the shunt member and across the gap at a first magnitude. It will be noted that FIG. 5 also generally represents the flow of magnetic flux through the magnetic circuit when no current is being applied to the coil 116.

Figure 6:
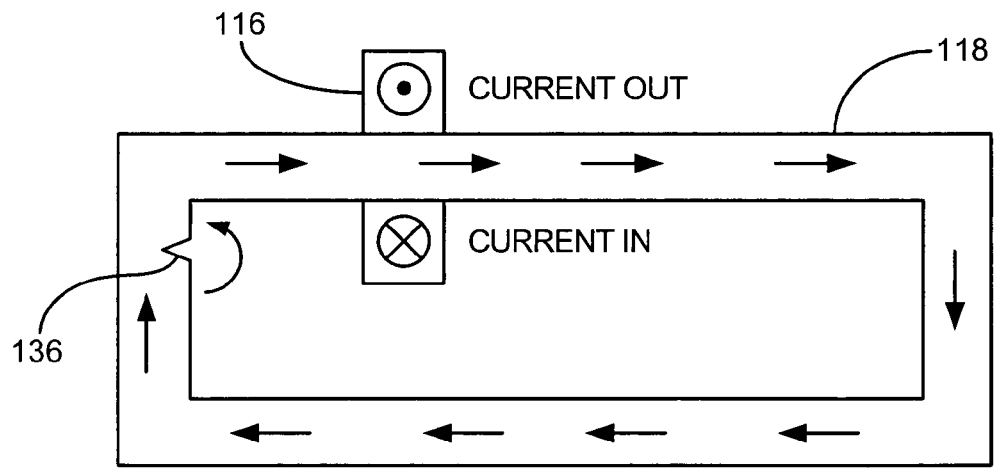
FIG. 6 corresponds to FIG. 5 and represents directions of magnetic flux established by the application of current to a coil of the actuator motor.

FIG. 6 represents the magnetic circuit 118 with the permanent magnet 132 removed to generally illustrate a second flow of magnetic flux induced by the application of current to the coil 116 in the direction shown. It will be noted that the applied current causes this second flow of magnetic flux to pass upwardly through the shunt member and across the gap at a second magnitude.

Figure 7:
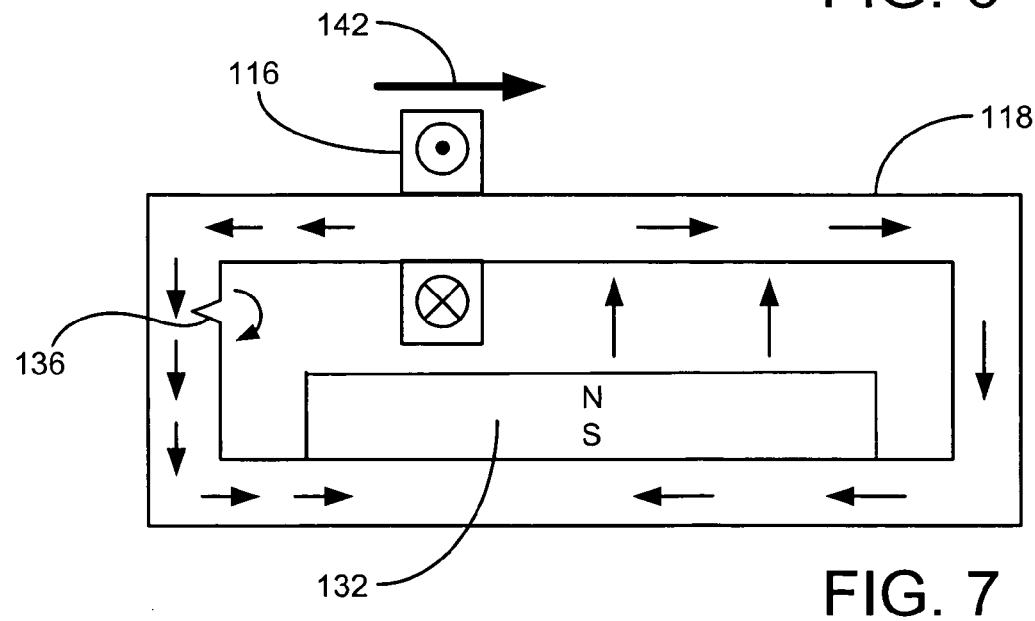
FIG. 7 corresponds to FIGS. 5 and 6 and generally illustrates the net effect from FIGS. 5–6, namely, a reduction in the retention force upon the actuator during an unlatching sequence.

FIG. 7 shows a result of the combination of FIGS. 5 and 6. When current is applied to the coil 116, the net magnetic flux across the gap 136 is reduced in relation to the magnetic flux induced by said current (FIG. 6). This results in a reduction in the magnitude of the retention force upon the plate 134.

In this way, once the actuator 110 has been securely latched by bringing the plate 134 into abutment across the gap 136 (as depicted in FIG. 4), the actuator 110 can be readily unlatched by the application of current to the coil, since the applied current substantially reduces the magnitude of the retention force and at the same time induces movement of the coil 116 away from the shunt member in the direction indicated by arrow 142 (FIG. 7).

It will now be understood that preferred embodiments of the present invention provide certain advantages over the prior art. The actuator motor 114 can be fabricated and assembled in an efficient and cost effective manner as compared to prior art configurations, and readily supports automated, top down manufacturing processes.

The open configuration of the c-shaped pole structure (base, support and pole members 124, 126, 128) readily facilitates merging of the heads 112 onto the disc surfaces. Limit stops can be incorporated into the actuator structure as discussed above, further reducing parts counts and assembly steps. The latching arrangement can be readily adapted for ID or OD head parking configurations, further allowing standardization of parts for different device models.

Another advantage relates to the variable retention force aspects disclosed herein. Prior art latching arrangements that utilize magnetic flux across a gap to latch the actuator are limited with regard to the maximum amount of retention force that can be applied. This is because there is a maximum limit to the amount of current that can be applied to the actuator; thus, prior art designers have had to balance generating a large amount of retention force and making sure that enough current was available to overcome such retention force when it came time to unlatch the actuator.

This problem is readily overcome by the actuator motor 114 disclosed herein, since the unlatching current automatically operates to reduce the retention force upon the actuator. Accordingly, higher latch retention forces can be utilized as compared to the prior art without the fear that the actuator will get "stuck" and be unable to pull away from the latched position.

While preferred embodiments presented above have configured the coil 116 to surround the pole member 128, such is for purposes of illustration and is not limiting to the scope of the claimed subject matter. Rather, any number of other coil/pole member configurations can be employed as desired, including but not limited to a flat coil, a curved pole piece, etc.

It will now be understood that the present invention (as embodied herein and as claimed below) is generally directed to an apparatus for latching an actuator, such as in a data storage device.

For purposes of the appended claims, it will be understood that the recited means for latching the coil with respect to the structure with a variable retention force will at least correspond to the disclosed gap 136 and plate 134, which operate as disclosed herein so that upon application of current to the coil, a magnitude of the magnetic flux across the gap is reduced thereby substantially reducing the retention force and at the same time urging the coil away from the gap.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the latch assembly without departing from the spirit and scope of the present invention.

In addition, although the embodiments described herein are directed to the latching of an actuator in a data storage device, such is not limiting to the scope of the claimed subject matter. Rather, any number of different types of motor driven actuators can be latched with a variable retention force as described herein.

What is claimed is:

1. An apparatus comprising a moveable electrical coil adjacent a magnetically permeable structure, wherein the coil is latched by magnetic flux passing across a gap extending into the structure, and wherein the coil is subsequently unlatched by application of current to the coil, said current substantially reducing the magnetic flux across the gap and inducing movement of the coil away from the gap.

2. The apparatus of claim 1, wherein the magnetically permeable structure comprises a laterally extending pole member along which the coil moves and a shunt member coupled to the pole member and into which the gap extends.

3. The apparatus of claim 2, wherein the magnetically permeable structure further comprises a support member coupled to the pole member and a base member coupled to the support member to form a unitary, substantially c-shaped member, and wherein the shunt member comprises an end piece coupled to the base member and the pole member opposite the support member.

4. The apparatus of claim 2, wherein the magnetically permeable structure further comprises a base member coupled to the shunt member so that the pole member, the shunt member and the base member form a unitary, substantially c-shaped member.

5. The apparatus of claim 1, further comprising a permanent magnet coupled to the structure which induces a flow of magnetic flux in said structure.

6. The apparatus of claim 1, further comprising a plate coupled to the coil through which at least a portion of the magnetic flux passing across the gap flows to retain the coil in a latched position.

7. The apparatus of claim 6, further comprising a compliant member disposed between the plate and the coil, the compliant member damping vibrations as the coil moves to a position proximate the gap.

8. The apparatus of claim 7, further comprising a second compliant member coupled to the coil opposite the plate, the second compliant member damping vibrations as the coil moves away from the gap to a distal extent of the structure.

9. The apparatus of claim 1, wherein the coil surrounds and moves laterally along said structure.

10. The apparatus of claim 1, wherein the coil forms a portion of a rotary actuator in a data storage device, the rotary actuator supporting a data transducing head adjacent a data storage medium.

11. An apparatus comprising:
a magnetic circuit comprising a pole member and a shunt member having a gap extending therein, wherein magnetic flux is directed across the gap; and
an actuator comprising an electrical coil adjacent the pole member and a plate coupled to the coil, wherein the actuator is latched by bringing the plate into a position adjacent the gap so that at least a portion of the magnetic flux across the gap flows through the plate to retain the plate with a retention force, and wherein the actuator is subsequently unlatched by applying a current to the coil, said current substantially reducing a magnitude of the retention force and inducing movement of the coil away from the shunt member.

12. The apparatus of claim 11, wherein the magnetic circuit further comprises a permanent magnet which directs the magnetic flux across the gap, the permanent magnet further directing magnetic flux along the pole member so that the coil is moved along the pole member in response to the application of current to the coil.

13. The apparatus of claim 11, wherein the magnetic circuit further comprises a support member coupled to the pole member and a base member coupled to the support member to form a unitary, substantially c-shaped member, and wherein the shunt member comprises an end piece coupled to the base member and the pole member opposite the support member.

14. The apparatus of claim 11, wherein the magnetic circuit further comprises a base member coupled to the shunt member so that the pole member, the shunt member and the base member form a unitary, substantially c-shaped member.

15. The apparatus of claim 11, further comprising a compliant member disposed between the plate and the coil, the compliant member damping vibrations as the plate is moved to a position proximate the gap.

16. The apparatus of claim 15, further comprising a second compliant member coupled to the coil opposite the plate, the second compliant member damping vibrations as the coil moves away from the gap to a distal extent of the pole member.

17. The apparatus of claim 11, wherein the coil surrounds and is adapted for lateral movement along the pole member.

18. The apparatus of claim 11, wherein the actuator is characterized as a rotary actuator in a data storage device, the rotary actuator supporting a data transducing head adjacent a data storage medium.

* * * * *